(12) United States Patent
Yun et al.

(10) Patent No.: US 11,563,523 B2
(45) Date of Patent: Jan. 24, 2023

(54) METHOD OF TRANSMITTING AND RECEIVING SIGNALS IN WLAN SYSTEM AND DEVICE FOR THE SAME

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 17/196,615

(22) Filed: Mar. 9, 2021

(65) Prior Publication Data

US 2021/0194631 A1 Jun. 24, 2021

Related U.S. Application Data

(63) Continuation of application No. 16/799,572, filed on Feb. 24, 2020, now Pat. No. 10,972,222, which is a
(Continued)

(51) Int. Cl.
*H04L 1/06* (2006.01)
*H04L 27/20* (2006.01)
(Continued)

(52) U.S. Cl.
CPC .............. *H04L 1/0618* (2013.01); *H04L 1/00* (2013.01); *H04L 1/0625* (2013.01); *H04L 5/001* (2013.01); *H04L 5/003* (2013.01); *H04L 5/0044* (2013.01); *H04L 27/206* (2013.01); *H04L 27/26* (2013.01); *H04W 88/08* (2013.01); *H04L 5/0007* (2013.01);
(Continued)

(58) Field of Classification Search
None
See application file for complete search history.

(56) References Cited

U.S. PATENT DOCUMENTS 10,225,122 B2 3/2019 Anwyl et al.
10,608,789 B2 3/2020 Yun et al.
(Continued)

FOREIGN PATENT DOCUMENTS

CN 103416017 11/2013
CN 103888402 6/2014
(Continued)

OTHER PUBLICATIONS

Yang et al. Dual Carrier Modulation Demapping Methods and Performances for Wireless USB, Signal Processing Laboratory The University of Reading, UK , 2008 (Year: 2008).*
(Continued)

*Primary Examiner* — Alex Skripnikov
(74) *Attorney, Agent, or Firm* — Lee Hong Degerman Kang Waimey

(57) ABSTRACT

A method of transmitting and receiving signals in a wireless local area network (WLAN) system and a device for the same are provided. More particularly, there are provided a method and a device for the same in which a station operating in an orthogonal frequency division multiplexing (OFDM) mode transmits and receives signals through two aggregated channels.

15 Claims, 14 Drawing Sheets

Related U.S. Application Data continuation of application No. 16/325,378, filed as application No. PCT/KR2018/004122 on Apr. 9, 2018, now Pat. No. 10,608,789.

(60) Provisional application No. 62/557,151, filed on Sep. 12, 2017, provisional application No. 62/557,158, filed on Sep. 12, 2017, provisional application No. 62/557,119, filed on Sep. 11, 2017, provisional application No. 62/537,000, filed on Jul. 26, 2017.

(51) Int. Cl.
*H04L 5/00* (2006.01)
*H04W 88/08* (2009.01)
*H04L 27/26* (2006.01)
*H04L 1/00* (2006.01)
*H04W 84/12* (2009.01)

(52) U.S. Cl.
CPC ........ *H04L 5/0023* (2013.01); *H04L 27/2602* (2013.01); *H04L 27/2603* (2021.01); *H04W 84/12* (2013.01)

(56) References Cited

U.S. PATENT DOCUMENTS

| | | |
|---|---|---|
| 2006/0067419 A1 | 3/2006 | Sandhu |
| 2016/0330738 A1 | 11/2016 | Eitan |
| 2016/0352552 A1 | 12/2016 | Liu et al. |
| 2017/0207830 A1 | 7/2017 | Lomayev et al. |
| 2017/0207838 A1 | 7/2017 | Lomayev et al. |
| 2017/0264351 A1 | 9/2017 | Lomayev et al. |
| 2017/0265217 A1 | 9/2017 | Lomayev et al. |
| 2019/0140773 A1 | 5/2019 | Lomayev et al. |
| 2019/0199478 A1 | 6/2019 | Yun et al. |
| 2020/0195380 A1 | 6/2020 | Yun et al. |

FOREIGN PATENT DOCUMENTS

| | | |
|---|---|---|
| CN | 104471873 | 3/2015 |
| KR | 1020140094583 | 7/2014 |
| WO | 2017026778 | 2/2017 |
| WO | 2017120145 | 7/2017 |

OTHER PUBLICATIONS

U.S. Appl. No. 16/325,378, Office Action dated Jul. 19, 2019, 14 pages.
U.S. Appl. No. 16/325,378, Notice of Allowance dated Nov. 18, 2019, 11 pages.
U.S. Appl. No. 16/799,572, Office Action dated Sep. 4, 2020, 7 pages.
PCT International Application No. PCT/KR2018/004122, International Search Report dated Jul. 13, 2018, 4 pages.
The State Intellectual Property Office of the People's Republic of China Application Serial No. 201880052542.X, Office Action dated Nov. 26, 2021, 7 pages.
MediaTek Inc., "System level results for R-ML receivers for scenario #1," 3GPP TSG-RAN WG1 #75, R1-135883, Nov. 2013, 3 pages.
European Patent Office Application Serial No. 18839391.2, Search Report dated Feb. 12, 2020, 13 pages.
The 802.11 Working Group of tne LAN/MAN Standards Committee of the IEEE Computer Society, P802.11aylm/D0.35 Draft Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, IEEE P802.11ayTM/D0.35, May 2017, 256 pages.
Huawei Technologies, "DCM SQPSK for Channel Aggregation in 11ay", IEEE 802.11-16/1490r3, Nov. 8, 2016, 18 pages.
Huawei Technologies, "EDMG PHY Header-A for DCM SQPSK Over Two Channel Aggregation in 11ay", IEEE 802.11-17/0061r6, Jan. 15, 2017, 6 pages.
State Intellectual Property Office of the People's Republic of China Application Serial No. 201880052542.X, Notice of Allowance dated May 6, 2022, 4 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

METHOD OF TRANSMITTING AND RECEIVING SIGNALS IN WLAN SYSTEM AND DEVICE FOR THE SAME

CROSS-REFERENCE TO RELATED APPLICATIONS

This application is a continuation of U.S. patent application Ser. No. 16/799,572, filed on Feb. 24, 2020, which is a continuation of U.S. patent application Ser. No. 16/325,378, filed on Feb. 13, 2019, now U.S. Pat. No. 10,608,789, which is the National Stage filing under 35 U.S.C. 371 of International Application No. PCT/KR2018/004122, filed on Apr. 9, 2018, which claims the benefit of U.S. Provisional Application Nos. 62/537,000, filed on Jul. 26, 2017, 62/557,119, filed on Sep. 11, 2017, 62/557,151, filed on Sep. 12, 2017, and 62/557,158, filed on Sep. 12, 2017, the contents of which are all hereby incorporated by reference herein in their entirety.

BACKGROUND OF THE INVENTION

Field of the Invention

The following description relates to a method and a device for the same for transmitting and receiving signals of a station in a wireless local area network (WLAN) system.

More particularly, the following description relates to a method and a device for the same in which a station operating in an orthogonal frequency division multiplexing (OFDM) mode transmits and receives signals through two aggregated channels.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present invention provides a method and a device for the same in which a station operating in an OFDM mode transmits and receives signals through two aggregated channels.

In an aspect, there is provided a method in which a first station (STA) transmits a signal to a second STA in a wireless local area network (WLAN) including mapping a modulation symbol value and a conjugated value of the modulation symbol value to a first aggregated channel and a second aggregated channel respectively, wherein the modulation symbol value is related with each pair of bits included in input encoded bits, wherein the first aggregated channel and the second aggregated channel are included in aggregated channels; and transmitting signals mapped to the first aggregated channel and the second aggregated channel to the second STA through the aggregated channels including the first aggregated channel and the second aggregated channel.

In another aspect, there is provided a station device for transmitting a signal in a wireless local area network (WLAN) system including a transceiver having at least one radio frequency (RF) chain and configured to transmit and receive signals to and from another station device; and a processor connected to the transceiver to process signals transmitted and received to and from the another station device, wherein the processor is configured to map a modulation symbol value and a conjugated value of the modulation symbol value to a first aggregated channel and a second aggregated channel respectively, wherein the modulation symbol value is related with each pair of bits included in input encoded bits, wherein the first aggregated channel and the second aggregated channel are included in aggregated channels; and to transmit signals mapped to the first aggregated channel and the second aggregated channel to the second STA through the aggregated channels including the first aggregated channel and the second aggregated channel.

In the above configuration, a modulation symbol value of an N-th bit pair included in the input encoded bits may be mapped to an N-th subcarrier in the first aggregated channel, and a conjugate value of the modulation symbol value of the N-th bit pair included in the input encoded bits may be mapped to an N-th subcarrier in the second aggregated channel. In this case, the N may be a natural number.

In this case, a modulation symbol of the N-th bit pair may be generated by applying a quadrature phase shift keying (QPSK) modulation method to the N-th bit pair.

In the above configuration, the first aggregated channel may have a bandwidth corresponding to 2.16 GHz or 4.32 GHz, and the second aggregated channel may have a bandwidth corresponding to 2.16 GHz or 4.32 GHz.

Further, the input encoded bits may include input encoded bits of first space-time stream and input encoded bits of second space-time stream, and the input encoded bits of the first space-time stream may have a length corresponding to/related with a number of coded bits per orthogonal frequency division multiplexing (OFDM) symbol, and the input encoded bits of the second space-time stream may have a length corresponding to/related with a number of coded bits per orthogonal frequency division multiplexing (OFDM) symbol.

In this case, a modulation symbol value of an X-th bit pair included in the input encoded bits of the first space-time stream may be mapped to an X-th subcarrier in the first aggregated channel, a modulation symbol value of a Y-th bit pair included in input encoded bits of the second space-time stream may be mapped to a (Y+Z)th subcarrier in the first aggregated channel. In this case, the X, Y, and Z may be natural numbers.

Here, a value of the Z may correspond to a half of the number of coded bits per the OFDM symbol.

Further, a conjugate value of a modulation symbol value of an X-th bit pair included in input encoded bits of the first space-time stream may be mapped to an X-th subcarrier in the second aggregated channel, and a conjugate value of a modulation symbol value of an Y-th bit pair included in the input encoded bits of the second space-time stream may be mapped to an (Y+Z)th subcarrier in the second aggregated channel.

In the above configuration, a physical protocol data unit (PPDU) including the transmitted signal may include a field indicating that a staggered quadrature phase shift keying (SQPSK) modulation method is applied across/for the aggregated channels.

In this case, the PPDU may be an enhanced directional multi gigabit (EDMG) orthogonal frequency division multiplexing (OFDM) mode PPDU.

Further, the field may be included in a first EDMG header field included in the EDMG OFDM mode PPDU.

In this case, the field may be a 'dual carrier modulation (DCM) SQPSK applied' field.

In another aspect, there is provided a method in which a first STA receives a signal from a second STA in a WLAN system including receiving signals through aggregated channels including a first aggregated channel and a second aggregated channel; and decoding bit information received based on a modulation symbol value mapped to the first aggregated channel and a conjugate value of the modulation symbol value mapped to the second aggregated channel.

In another aspect, there is provided a station device for receiving a signal in a WLAN system including a transceiver having at least one radio frequency (RF) chain and configured to transmit and receive signals to and from another station device; and a processor connected to the transceiver to process signals transmitted and received to and from the another station device, wherein the processor is configured to receive signals through aggregated channels including a first aggregated channel and a second aggregated channel; and to decode bit information received based on a modulation symbol value mapped to the first aggregated channel and a conjugate value of the modulation symbol value mapped to the second aggregated channel.

The effect that can be obtained from the present invention is not limited to the above-described effects and the other effects will be understood by those skilled in the art from the following description.

Advantageous Effects

Through the above configuration, a station operating in an OFDM mode according to the present invention can more reliably transmit and receive signals through two aggregated channels.

The effect that can be obtained from the present invention is not limited to the above-described effects and the other effects will be understood by those skilled in the art from the following description.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General wireless LAN (WLAN) system

Figure 1:
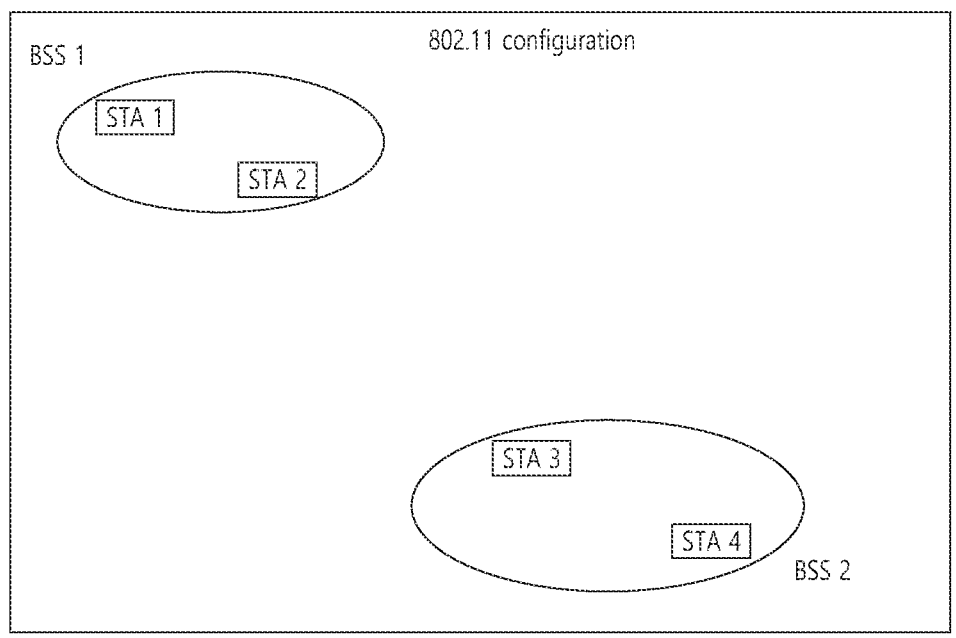
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
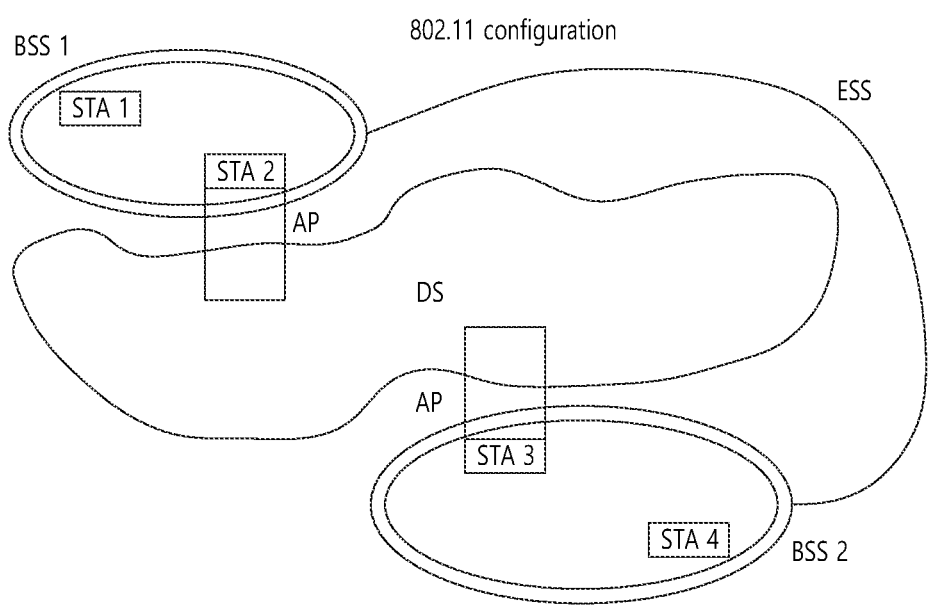
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel bonding in a wireless LAN (WLAN) system

Figure 3:
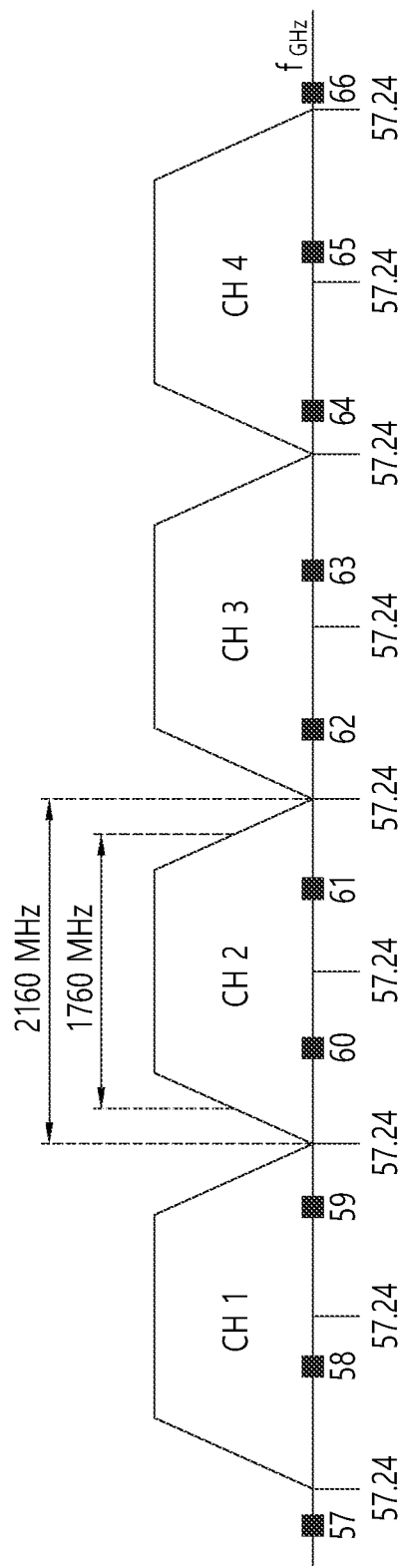
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
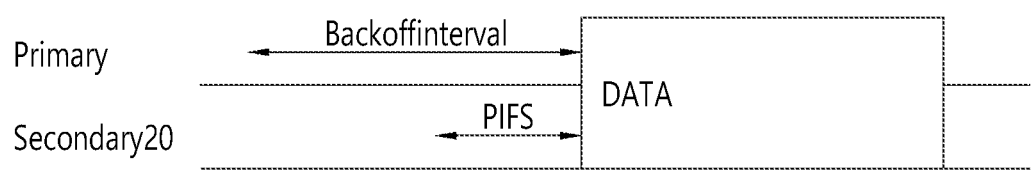
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
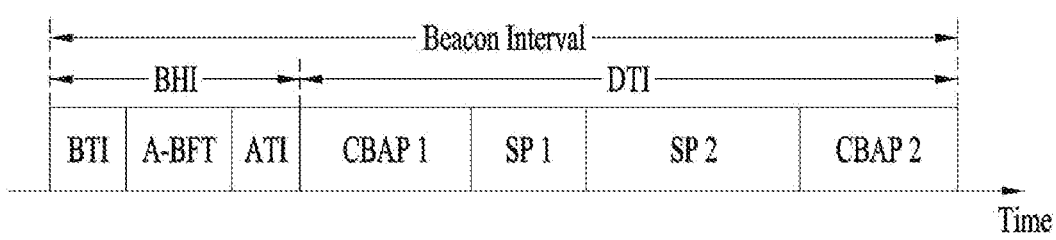
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY | 1...12 | (low power SC PHY) |
| (SC PHY) | 25...31 | |
| OFDM PHY | 13...24 | |

Such modulation modes may be used for satisfying different requirements (e.g., high throughput or stability). Depending upon the system, among the modulation modes presented above, only some of the modulation modes may be supported.

Figure 6:
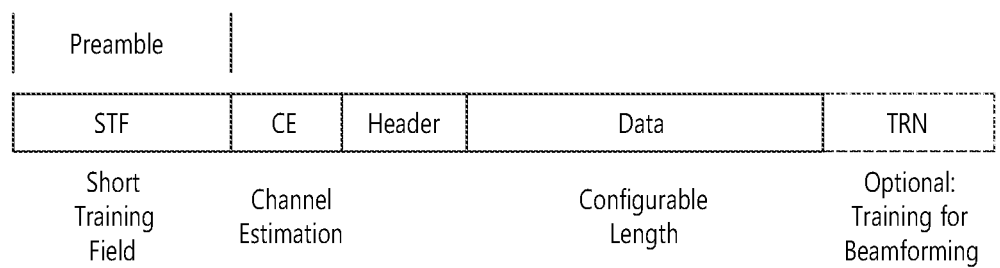
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
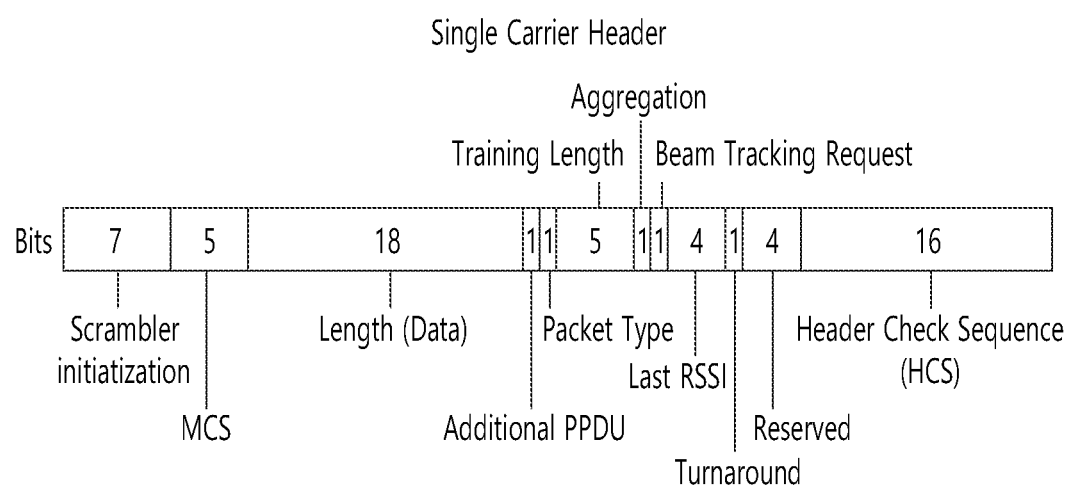
FIG. 7 and FIG. 8 are diagrams describing a configuration of a header field of the radio frame shown in FIG. 6.
Figure 8:
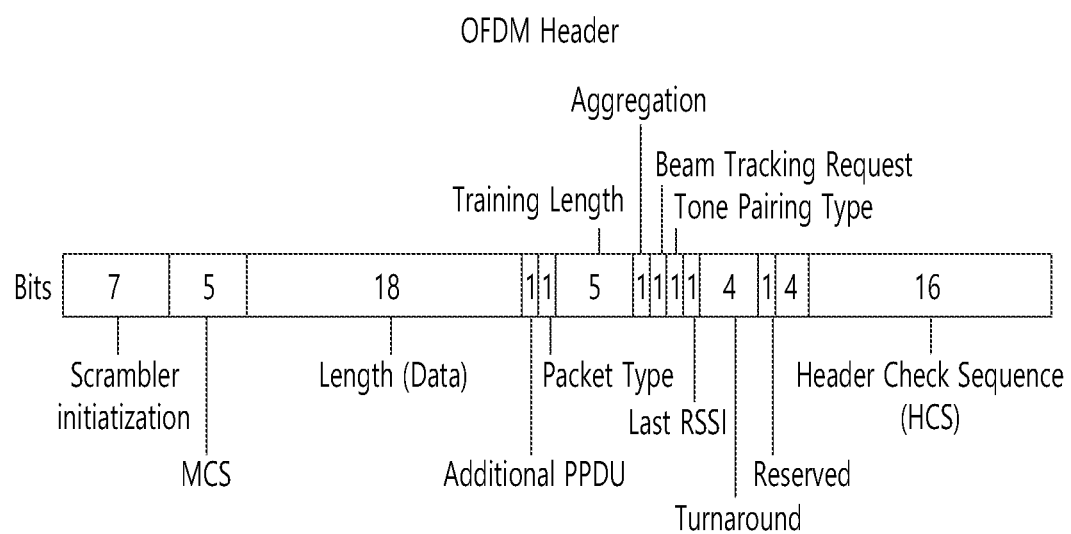

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RS SI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as int he case of FIG. 7, in the description presented below, such reserved bits may also be used.

As described above, the IEEE 802.11ay system considers for the first time the adoption of channel bonding the MIMO technique to the legacy llad system. In order to implement channel boning and MIMO, the 11 ay system requires a new PPDU structure. In other words, when using the legacy 11 ad PPDU structure, there are limitations in supporting the legacy user equipment (UE) and implementing channel bonding and MIMO at the same time.

For this, a new field for the llay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11 ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
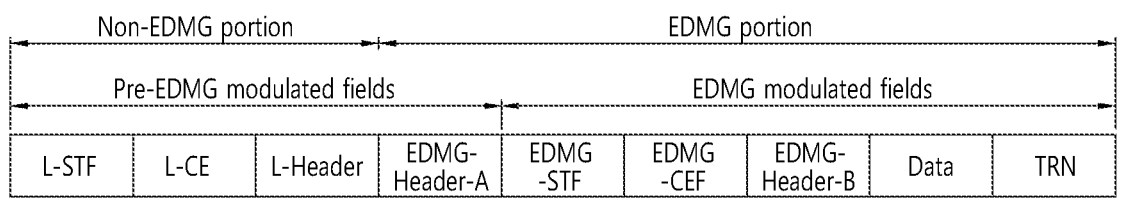
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

A (legacy) preamble part of the PPDU is used for packet detection, automatic gain control (AGC), frequency offset estimation, synchronization, indication of modulation (SC or OFDM), and channel estimation. A format of the preamble is common to both OFDM packets and SC packets. In this case, the preamble is composed of two parts: a short training field (STF) and a channel estimation (CE) field located after the STF.

3. Embodiment Applicable to the Present Invention

Hereinafter, a dual carrier modulation (DCM) technique in an orthogonal frequency division multiplexing (OFDM) mode and a method of transmitting and receiving a signal based on the DCM technique based on the above technical configuration will be described in detail.

More specifically, in the present invention, a technical configuration suggested in the present invention will be described using a method of transmitting and receiving a signal by applying a DCM staggered quadrature phase shift keying (SQPSK) modulation method in a channel aggregation situation of an OFDM mode. However, the SQPSK modulation method is one of applicable modulation methods, and in other exemplary embodiments according to the present invention, a different modulation method may be applied.

Further, channel aggregation described in the present invention includes both an aggregation configuration (e.g., 2.16 GHz+2.16 GHz) of two channels and an aggregation configuration (e.g., 4.32 GHz+4.32 GHz) of four channels defined in an 11ay system or the like.

The present invention provides the following method of transmitting and receiving a signal based on such technical configurations.

According to an 11ay system to which the present invention can be applied, the EDMG Header-A field of FIG. 10 may include fields of Table 2.

TABLE 2

| Field | Number of bits | Start bit |
|---|---|---|
| SU/MU Format | 1 | 0 |
| Channel Aggregation | 1 | 1 |
| BW | 8 | 2 |
| Primary Channel Number | 3 | 10 |
| Beamformed | 1 | 13 |
| Short/Long LDPC | 1 | 14 |
| STBC Applied | 1 | 15 |
| PSDU Length | 22 | 16 |
| Number of SS | 3 | 38 |
| EDMG-MCS | 21 | 41 |
| DCM SQPSK Applied | 1 | 62 |

Here, Table 2 illustrates only some fields that may be included in the EDMG Header-A field, and the EDMG Header-A field according to the present invention may include other fields in addition to the fields of Table 2.

However, according to the conventional system, a 'DCM SQPSK Applied' field included in the EMDG Header-A field may be used only for an SC mode but not for an OFDM mode. This is because a DCM SQPSK operation in an OFDM mode is not defined.

Accordingly, in the present invention, the DCM SQPSK operation in the OFDM mode is newly defined, and thus the DCM SQPSK Applied field in the OFDM mode may be interpreted as follows.

"If set to 1 in EDMG OFDM mode PPDU, indicates that SPQSK across the aggregated channels was applied at the transmitter. Otherwise, set to 0."

When a value of the 'DCM SQPSK Applied' field in the EDMG Header-A field is set to '1', by applying one of the following suggesting methods, the transmitter may transmit a signal to the receiver through aggregated channels.

3.1. First Method (SQPK in each Aggregated Channel)

Figure 11:
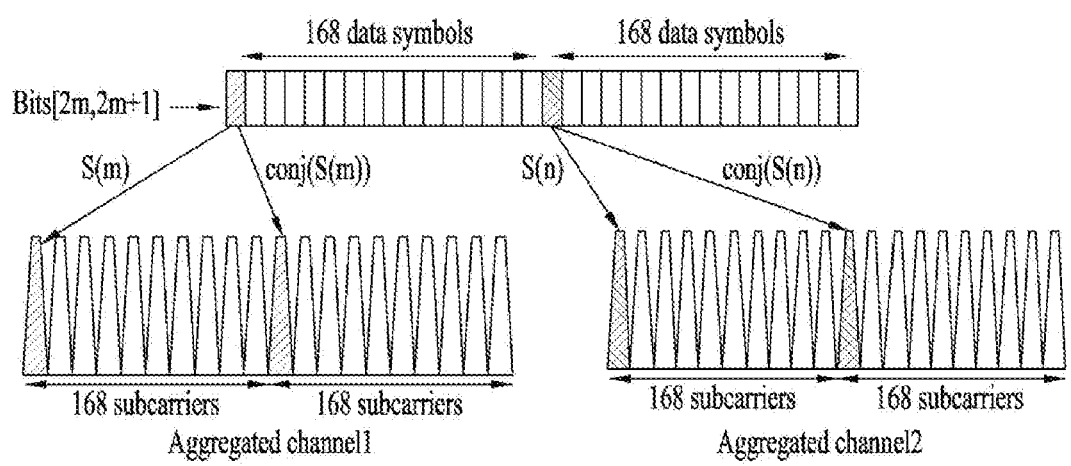
FIG. 11 is a diagram simply illustrating a method of transmitting signals through aggregated channels according to a first method of the present invention.

FIG. 11 is a diagram simply illustrating a method of transmitting a signal through aggregated channels according to a first method of the present invention.

First, the transmitter may divide a signal to be transmitted into data symbols of a predetermined length. More specifically, the transmitter may divide input encoded bits to be transmitted into data symbols of a predetermined length (or the number of coded bits per one OFDM symbol). In this case, the data symbols of the predetermined length may have 336 lengths, 734 lengths, 1134 lengths, or 1532 lengths.

For example, the transmitter may apply a QPSK modulation method to a bit sequence to be transmitted to generate a data symbol of a 336 length unit. In this case, the data symbol having an index m (where m is 0 to 335) in the data symbol having 336 lengths may correspond to the bit sequence (bit sequence having an index 2m, bit sequence having an index (2m+1)).

Thereafter, as shown in FIG. 11, the transmitter may map data symbols divided into the predetermined length unit to a first aggregated channel or a second aggregated channel and transmit the data symbols to the receiver.

More specifically, the transmitter may divide data symbols (e.g., data symbols of 336 lengths) divided into the predetermined length unit into two groups and map data symbols corresponding to each group (e.g., a first half of the data symbols, a second half of the data symbols) to the first aggregated channel or the second aggregated channel using an SQPSK modulation method.

Accordingly, the transmitter may map a first value corresponding to a specific data symbol included in a first group and a second value, which is a conjugate value of the first value to the first aggregated channel. In this case, ½ of the total number of subcarriers included in the aggregated channels may be applied to a subcarrier gap to which the first value and the second value are mapped.

That is, a symbol value S(X) of an X-th data symbol included in a first group of FIG. 11 may be mapped to an X-th subcarrier of the first aggregated channel, and a conjugated value conj (S (X)) of the symbol value of the X-th data symbol may be mapped to a (168+X)-th subcarrier of the first aggregated channel.

Similarly, the transmitter may map a third value corresponding to a specific data symbol included in a second group and a fourth value, which is a conjugate value of the third value to a second aggregated channel. In this case, ½ of the total number of subcarriers included in the aggregated channels may be applied to a subcarrier gap to which the third value and the fourth value are mapped.

That is, a symbol value S(Y) of an Y-th data symbol included in the second group of FIG. 11 may be mapped to an Y-th subcarrier of a second aggregated channel, and a conjugated value conj (S (Y)) of the symbol value S(Y) of the Y-th data symbol may be mapped to a (168+Y)-th subcarrier of the second aggregated channel. Here, FIG. 11 shows the case of single channel aggregation (2.16 GHz+

2.16 GHz), wherein each aggregated channel may be configured with 336 subcarriers, but in the case of 2 channel bonding channel aggregation (4.32 GHz+4.32 GHz), each aggregated channel may be configured with 734 subcarriers. In this case, a conjugate value conj (S (Y)) of a symbol value of the Y-th data symbol may be mapped to a (367+Y)th subcarrier of the second aggregated channel.

When generally describing the above configuration, the first half of data symbols is mapped to a first half of the first aggregated channel. Its conjugated repetitions are mapped to a second half of the first aggregated channel. Similarly, a second half of data symbols is mapped to a first half of the second aggregated channel. Its conjugated repetitions are mapped to a second half of the second aggregated channel.

3.2. Second Method (SQPK Across the Aggregated Channels)

Unlike the foregoing first method, in accordance with a second method according to the present invention, a symbol value of a modulated data symbol may be mapped to a first aggregated channel, and a conjugate value of the symbol value may be mapped to a second aggregated channel.

Figure 12:
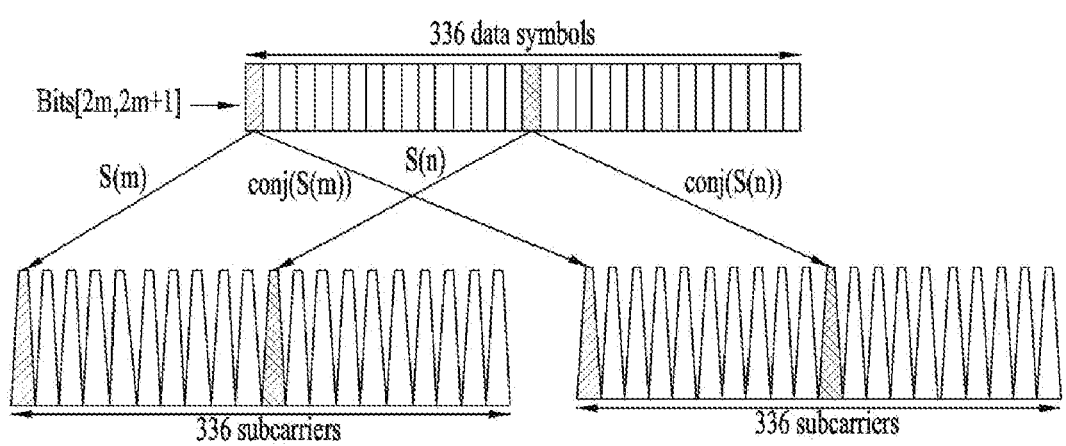
FIG. 12 is a diagram simply illustrating a method of transmitting signals through aggregated channels according to a second method of the present invention.

FIG. 12 is a diagram simply illustrating a method of transmitting a signal through aggregated channels according to a second method of the present invention.

According to the second method of the present invention, the transmitter may map a symbol value of data symbols divided into the predetermined length unit and a conjugate repetition value (or conjugate value) of the symbol value to other aggregated channels and transmit the mapped symbol value and conjugate repetition value (or conjugate value) to the receiver.

More specifically, the transmitter may sequentially map symbol values of data symbols (e.g., data symbols of 336 lengths) divided into the predetermined length unit to subcarriers of the first aggregated channel, sequentially map conjugate (repetition) values of the data symbols to subcarriers of the second aggregated channel, and transmit the mapped symbol values and conjugate (repetition) values to the receiver.

Accordingly, a symbol value S(X) of an X-th data symbol among the data symbols (e.g., data symbols of 336 lengths) divided into the predetermined length unit may be mapped and transmitted to an X-th subcarrier of the first aggregated channel, and a conjugate repetition value conj (S(X)) of the X-th data symbol may be mapped and transmitted to an X-th subcarrier of the second aggregated channel.

As a simulation result of the first method and the second method, it may be determined that a modulation method according to the second method has a better performance than that of the modulation method according to the first method.

More specifically, in the case of an 11ad CB channel model, signal to noise ratios (SNR) of a first method (Option 1) and a second method (Option 2) may be shown in Table 3.

TABLE 3

| PER | Option1 | Option2 | Gain |
|---|---|---|---|
| 1% | −1.48 dB | −1.46 dB | ~0.02 dB |
| 0.1% | −1.2 dB | −1.1 dB | ~0.1 dB |

That is, in all cases where a packet error rate (PER) is 1% and 0.1%, it can be seen that the second method has a higher SNR gain than that of the first method.

Further, in the case of the 11 ad CR channel model, SNRs of the first method (Option 1) and the second method (Option 2) may be shown in Table 4.

TABLE 4

| PER | Option1 | Option2 | Gain |
|---|---|---|---|
| 1% | 0.75 dB | 1.07 dB | ~0.4 dB |
| 0.1% | 1.87 dB | 2.63 dB | ~0.8 dB |

That is, in all cases where the PER is 1% and 0.1%, it can be seen that the second method has a higher SNR gain than that of the first method.

In this way, SQPSK in channel aggregation (SQPSK) scheme in channel aggregation according to the second method having a better performance may be summarized as follows.

In SQPSK modulation across the aggregated channels, the input streams of the first space-time stream ($i_{sts}=1$) and the second space-time stream ($i_{sts}=2$) is broken into the groups of $N_{CBPS}$ bits as:

$$(c_0^{(i_{sts}=1,q)}, c_1^{(i_{sts}=1,q)}, \ldots, c_{N_{CBPS}-1}^{(i_{sts}=1,q)}) \text{ and}$$
$$(c_0^{(i_{sts}=2,q)}, c_1^{(i_{sts}=2,q)}, \ldots, c_{N_{CBPS}-1}^{(i_{sts}=2,q)}) \quad \text{[Equation 1]}$$

In the above description, $N_{CBPS}$ denotes the number of coded bits per OFDM symbol, and q denotes a group number.

For reference, the $N_{CBPS}$ may be differently defined as follows according to a modulation type and $N_{SD}$, which is the number N of data subcarriers per channel.

TABLE 5

| Symbol mapping | $N_{SD} = 336$ | $N_{SD} = 734$ | $N_{SD} = 1134$ | $N_{SD} = 1532$ |
|---|---|---|---|---|
| SQPSK | 336 | 734 | 1134 | 1532 |
| QPSK | 672 | 1468 | 2268 | 3064 |
| 16-QAM | 1344 | 2936 | 4536 | 6128 |
| 64-QAM | 2016 | 4404 | 6804 | 9192 |

Accordingly, FIGS. 11 and 12 show that $N_{CBPS}$ and $N_{SD}$ are 336, respectively.

Each pair of bits ($c_{2k}^{(i_{sts}=1, q)}$, $c_{2k+1}^{(i_{sts}=1,q)}$) and ($c_{2k}^{(i_{sts}=2, q)}$, $c_{2k+1}^{(i_{sts}=2,q)}$), (k=0, 1, . . . , $N_{CBPS}/2-1$) of input stream per each time-space stream are converted into a complex constellation point $$d_k^{(i_{sts}=1,q)} = \frac{1}{\sqrt{2}}\left((2c_{2k}^{(i_{sts}=1,q)} - 1) + j(2c_{2k+1}^{(i_{sts}=1,q)} - 1)\right) \text{ and}$$

$$d_k^{(i_{sts}=2,q)} = \frac{1}{\sqrt{2}}\left((2c_{2k}^{(i_{sts}=2,q)} - 1) + j(2c_{2k+1}^{(i_{sts}=2,q)} - 1)\right),$$

respectively.

where $d_k^{(i_{sts}=1,q)}$ generates the constellation point for the first half of the OFDM subcarriers in channel containing the primary 2.16 GHz (primary channel), and $d_{P(k)}^{(i_{sts}=1,q)} = d_k^{(i_{sts}=2,q)}$ generates the constellation point for the second half of the OFDM subcarriers in channel containing the primary 2.16 GHz (primary channel).

Further, conj($d_k^{(i_{sts}=1,q)}$) generates the constellation point for the first half of the OFDM subcarriers in channel that does not contain the primary channel, and $d_{P(k)}^{(i_{sts}=2,q)} =$ conj ($d_k^{(i_{sts}=q)}$) generates the constellation point for the second half of the OFDM subcarriers in channel that does not contain the primary channel.

In the above description, P(k) denotes an index indicating an index from $N_{CBPS}/2$ to $N_{CBPS}-1$. In this case, as in the present invention, when $N_{CBPS}=N_{SD}$, P(k) may be represented by Equation 2.

$$P(k) = k + \frac{N_{SD}}{2} \text{ for } k = 0, 1, 2, \ldots, \frac{N_{SD}}{2} - 1 \quad [\text{Equation 2}]$$

The above configuration may be represented as follows:

First, the transmitter may divide input encoded bits per space-time stream into groups of $N_{CBPS}$ bits. In this case, encoded bits included in a single group may be represented by Equation 3.

$$\left( c_0^{(i_{SS},q)}, c_1^{(i_{SS},q)}, \ldots, c_{N_{CBPS}-1}^{(i_{SS},q)} \right) \quad [\text{Equation 3}]$$

where $i_{ss}$ denotes space-time stream, and q denotes a group number.

A bit pair $(c_{2k}^{(i_{ss},q)}, c_{2k+1}^{(i_{ss},q)})$ of encoded bits included in the single group may be converted to a complex point $d(i_{SS},q,k)$. Here, k values are $0, 1, \ldots, N_{SD}/2-1$.

In other words, the transmitter may convert a bit pair of input encoded bits per the each space-time stream to a single complex point $d(i_{SS},q,k)$.

In this case, in the OFDM mode, when two channels are aggregated (e.g., 2.16+2.16 GHz) or when four channels are aggregated (e.g., 4.32+4.32 GHz), the transmitter may apply a complex point $d(i_{SS},q,k)$ of a first aggregated channel ($i_{ss}=1$) and a second aggregated channel ($i_{SS}=2$) among the aggregated channels as in Equation 4.

$$d(i_{SS} = 1, q, k) = \frac{1}{\sqrt{2}} \left( \left( 2 \times c_{2k}^{(i_{ss}=1,q)} - 1 \right) + j \left( 2 \times c_{2k+1}^{(i_{ss}=1,q)} - 1 \right) \right)$$

$$d(i_{SS} = 1, q, P(k)) = \frac{1}{\sqrt{2}} \left( \left( 2 \times c_{2k}^{(i_{ss}=2,q)} - 1 \right) + j \left( 2 \times c_{2k+1}^{(i_{ss}=2,q)} - 1 \right) \right)$$

$$d(i_{SS} = 2, q, k) = \frac{1}{\sqrt{2}} \left( \left( 2 \times c_{2k}^{(i_{ss}=1,q)} - 1 \right) - j \left( 2 \times c_{2k+1}^{(i_{ss}=1,q)} - 1 \right) \right)$$

$$d(i_{SS} = 2, q, P(k)) = \frac{1}{\sqrt{2}} \left( \left( 2 \times c_{2k}^{(i_{ss}=2,q)} - 1 \right) - j \left( 2 \times c_{2k+1}^{(i_{ss}=2,q)} - 1 \right) \right)$$

[Equation 4]

where P(k) may be represented by Equation 2.

Through such a process, the $q^{th}$ modulated data block of the $i_{ss}^{th}$ space stream is mapped to NSD data subcarriers of the $q^{th}$ OFDM symbol of the $i_{ss}^{th}$ space stream.

Figure 13:
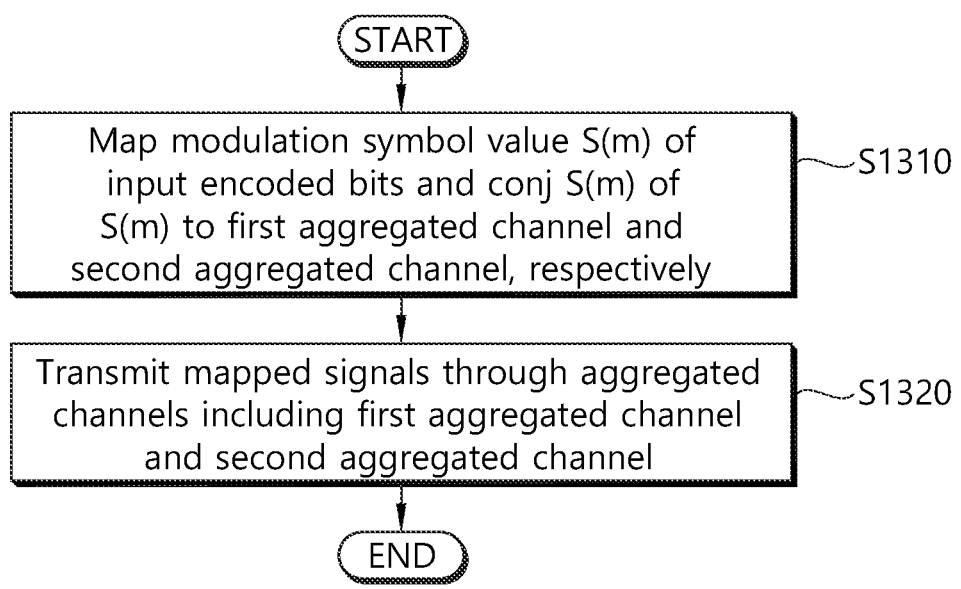
FIG. 13 is a flowchart illustrating a method of transmitting a signal of a transmitter according to an exemplary embodiment of the present invention.

FIG. 13 is a flowchart illustrating a method of transmitting a signal of a transmitter according to an exemplary embodiment of the present invention.

First, the transmitter maps a modulation symbol value (e.g., S(m)) of each pair of bits included in input encoded bits and a conjugate value (e.g., conj (S(m)) of the modulation symbol value to a first aggregated channel and a second aggregated channel, respectively, included in aggregated channels (S1310).

More specifically, as shown in FIG. 12, the transmitter may map a data symbol S (m) of the input encoded bits to the first aggregated channel and map conj S(m), which is a conjugate repetition value of the data symbol S(m) to the second channel. In this case, the number of data symbols of the input encoded bits may be set equal to that of (data) subcarriers included in each aggregated channel.

Accordingly, the transmitter may map a modulation symbol value of an N-th bit pair included in the input encoded bit to an N-th subcarrier in the first aggregated channel and map a conjugate value of a modulation symbol value of an N-th bit pair included in the input encoded bits to an N-th subcarrier in the second aggregated channel. That is, as shown in FIG. 12, when a first data symbol value of the input encoded bits is S(x), the transmitter may map the S(x) to a first subcarrier of the first aggregated channel and map conj S(x), which is a modulation repetition value of the S(x) to a first subcarrier of the second aggregated channel.

In such a method, the modulation symbol may be generated by applying a quadrature phase shift keying (QPSK) modulation method. Through such a method, the transmitter operating in an OFDM mode may map signals to which a DCM SQPSK technique is applied to the input encoded bits to the first aggregated channel and the second aggregated channel.

Thereafter, the transmitter transmits signals mapped to the first aggregated channel and the second aggregated channel to the second STA through the aggregated channels including the first aggregated channel and the second aggregated channel (S1320). In this case, the transmitter may transmit the signal through at least one OFDM symbol of the aggregated channels.

The signal transmitted at step S1320 may be included and transmitted in a physical protocol data unit (PPDU). In this case, the PPDU may include a field indicating that a staggered quadrature phase shift keying (SQPSK) modulation method of the signal (or data) is applied across/for the aggregated channels together with the signal (or data).

For example, the PPDU may be an enhanced directional multi gigabit (EDMG) orthogonal frequency division multiplexing (OFDM) mode PPDU. In this case, the field may be included in a first EDMG header field (e.g., EDMG Header-A field) included in the EDMG OFDM mode PPDU. Here, the field may be a 'dual carrier modulation (DCM) SQPSK applied' field.

In the above configuration, the first aggregated channel may have a bandwidth corresponding to 2.16 GHz or 4.32 GHz, and the second aggregated channel may have a bandwidth corresponding to 2.16 GHz or 4.32 GHz.

More specifically, a method in which a transmitter transmits a signal through at least one OFDM symbol may be as follows.

First, the transmitter may apply a DCM SPQSK modulation scheme to input encoded bits (sequentially) including input encoded bits of first space-time stream and input encoded bits of second space-time stream to map corresponding signals to the first aggregated channel and the second aggregated channel, respectively. In this case, input encoded bits corresponding to one OFDM symbol may (sequentially) include input encoded bits of the first space-time stream having a length corresponding to $N_{CBPS}$ (the number of coded bits per symbol) and input encoded bits of the second space-time stream.

Here, according to a general configuration suggested by the present invention, the transmitter may map a modulation symbol value of an X-th bit pair included in input encoded bits of the first space-time stream to an X-th subcarrier in the first aggregated channel and map a modulation symbol value of an Y-th bit pair included in input encoded bits of the second space-time stream to a (Y+Z)th subcarrier in the first aggregated channel (see FIG. 12). Here, the value of the Z may correspond to $N_{CBPS}/2$.

Accordingly, the transmitter may map a conjugate value of a modulation symbol value of an X-th bit pair included in the input encoded bits of the first space-time stream to an X-th subcarrier in the second aggregated channel and map a conjugate value of a modulation symbol value of a Y-th bit pair included in input encoded bits of the second space-time stream to a (Y+Z)th subcarrier in the second aggregated channel.

Through the above method, the transmitter may map a signal corresponding to a single OFDM symbol to the first aggregated channel and the second aggregated channel. That is, when the transmitter applies a DCM SQPSK modulation scheme to a signal corresponding to a plurality of OFDM symbols, by applying multiple times a DCM SQPSK modulation scheme for a signal corresponding to the single OFDM symbol, the transmitter may map the corresponding signal to the first aggregated channel and the second aggregated channel.

Thereafter, the transmitter may transmit signals mapped to the first aggregated channel and the second aggregated channel to a receiver.

In this case, the at least one OFDM symbol may be included and transmitted in a data field (or another field) of an EDMG OFDM mode PPDU.

The receiver may receive a signal transmitted by the transmitter through the above method, through the following method.

First, the receiver receives a signal transmitted through aggregated channels including the first aggregated channel and the second aggregated channel.

Thereafter, the receiver decodes bit information received based on the modulation symbol value mapped to the first aggregated channel and a conjugation value of the modulation symbol value mapped to the second aggregated channel. To this end, the receiver may receive a signal transmitted from the transmitter using a combining technique such as maximal ratio combining (MRC). Thereby, the receiver may obtain information on input encoded bits in which the transmitter intends to transmit, and the transmitter and the receiver may obtain a diversity gain through a DCM SQPSK modulation technique.

4. Device Configuration

Figure 14:
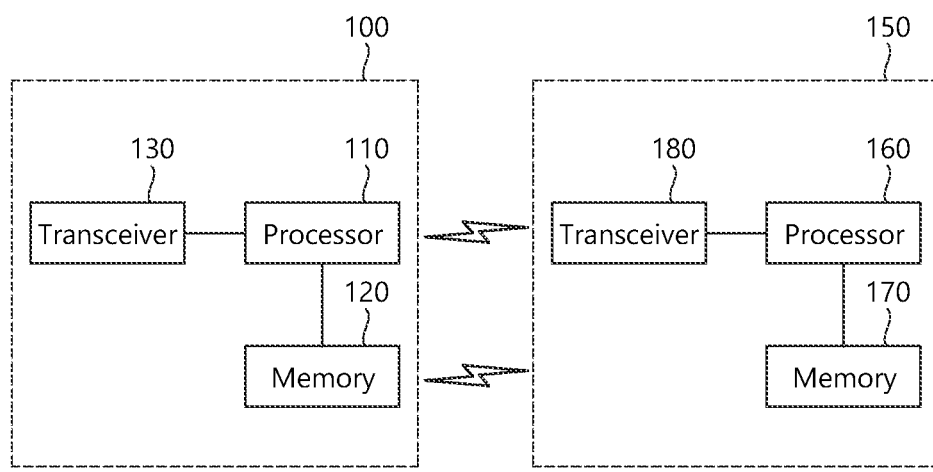
FIG. 14 is a diagram illustrating a device for implementing the above-described method.

FIG. 14 is a diagram illustrating a device for implementing the above-described method.

A wireless device 100 of FIG. 14 may correspond to an STA that transmits a signal described in the above description, and a wireless device 150 may correspond to an STA that receives a signal described in the above description.

In this case, the station transmitting the signal may correspond to a PCP/AP or an 11ay terminal supporting an 11ay system, and the station receiving the signal may correspond to a legacy terminal (e.g., 11ad terminal) that does not support the 11ay system as well as a PCP/AP or an 11ay terminal supporting the 11ay system.

Hereinafter, for convenience of description, the STA transmitting a signal is referred to as a transmitting device 100, and the STA receiving a signal is referred to as a receiving device 150.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method for transmitting, by a first station, STA, a signal to a second STA in a wireless local area network, WLAN, the method comprising:

mapping a modulation symbol value and a conjugate value of the modulation symbol value to a first channel and a second channel respectively, wherein the modulation symbol value is related with each pair of bits included in input encoded bits, wherein the first channel and the second channel are included in aggregated channels; and transmitting signals mapped to the first channel and the second channel to the second STA through the aggregated channels, wherein the modulation symbol value mapped to the first channel for a $q^{th}$ orthogonal frequency division multiplexing, OFDM, symbol is defined as below:

$$d(i_{SS}=1, q, k) = \frac{1}{\sqrt{2}}\left(\left(2 \times c_{2k}^{(i_{ss}=1,q)} - 1\right) + j\left(2 \times c_{2k+1}^{(i_{ss}=1,q)} - 1\right)\right)$$

-continued $$d(i_{SS}=1, q, P(k)) = \frac{1}{\sqrt{2}}\left(\left(2 \times c_{2k}^{(i_{ss}=2,q)} - 1\right) + j\left(2 \times c_{2k+1}^{(i_{ss}=2,q)} - 1\right)\right),$$

wherein the conjugate value of the modulation symbol value mapped to the second channel for the $q^{th}$ OFDM symbol is defined as below:

$$d(i_{SS}=2, q, k) = \frac{1}{\sqrt{2}}\left(\left(2 \times c_{2k}^{(i_{ss}=1,q)} - 1\right) - j\left(2 \times c_{2k+1}^{(i_{ss}=1,q)} - 1\right)\right)$$

$$d(i_{SS}=2, q, P(k)) = \frac{1}{\sqrt{2}}\left(\left(2 \times c_{2k}^{(i_{ss}=2,q)} - 1\right) - j\left(2 \times c_{2k+1}^{(i_{ss}=2,q)} - 1\right)\right),$$

wherein $d(i_{ss}=1, q, k)$ denotes a constellation point mapped to a first half of subcarriers in the first channel, $d(i_{ss}=1, q, P(k))$ denotes a constellation point mapped to a second half of the subcarriers in the first channel, $d(i_{ss}=2, q, k)$ denotes a constellation point mapped to a first half of subcarriers in the second channel, $d(i_{ss}=2, q, P(k))$ denotes a constellation point mapped to a second half of the subcarriers in the second channel, $i_{ss}$ denotes an index for space-time streams, STSs, k denotes a subcarrier index, wherein $P^{(k)}$ is defined as below:

$$P(k) = k + \frac{N_{SD}}{1} \text{ for } k = 0, 1, 2, \ldots, \frac{N_{SD}}{2} - 1,$$

wherein $N_{SD}$ denotes a number of subcarriers per channel,
wherein the input encoded bits are divided into groups of $N_{CBPS}$ bits, and bits included in each group are defined as below:

$$(c_0^{(iss,q)}, c_1^{(iss,q)}, \ldots, c_{N_{CBPS}-1}^{(iss,q)}),$$

wherein $N_{CBPS}$ denotes a number of coded bits per OFDM symbol,
wherein each pair of bits included in each group is defined as below:

$$(c_{2k}^{(iss,q)}, c_{2k+1}^{(i_{ss},q)}).$$

2. The method of claim 1, wherein the first channel has a bandwidth of 2.16 GHz or 4.32 GHz, and the second channel has a bandwidth of 2.16 GHz or 4.32 GHz.

3. The method of claim 1, wherein a physical protocol data unit, PPDU, comprising the transmitted signal comprises a field indicating that a staggered quadrature phase shift keying, SQPSK, modulation method is applied for the aggregated channels.

4. The method of claim 3, wherein the PPDU is an enhanced directional multi gigabit, EDMG, OFDM mode PPDU.

5. The method of claim 4, wherein the field is included in a EDMG header field included in the EDMG OFDM mode PPDU.

6. The method of claim 5, wherein the field is a 'dual carrier modulation, DCM, SQPSK applied' field.

7. A method for receiving, by a first station, STA, a signal from a second STA in a wireless local area network, WLAN, system, the method comprising:
receiving a signal through aggregated channels comprising a first channel and a second channel; and
decoding bit information received based on a modulation symbol value mapped to the first channel and a conjugate value of the modulation symbol value mapped to the second channel,
wherein the modulation symbol value mapped to the first channel for a $q^{th}$ orthogonal frequency division multiplexing, OFDM, symbol is defined as below:

$$d(i_{SS}=1, q, k) = \frac{1}{\sqrt{2}}\left(\left(2 \times c_{2k}^{(i_{ss}=1,q)} - 1\right) + j\left(2 \times c_{2k+1}^{(i_{ss}=1,q)} - 1\right)\right)$$

$$d(i_{SS}=1, q, P(k)) = \frac{1}{\sqrt{2}}\left(\left(2 \times c_{2k}^{(i_{ss}=2,q)} - 1\right) + j\left(2 \times c_{2k+1}^{(i_{ss}=2,q)} - 1\right)\right),$$

wherein the conjugate value of the modulation symbol value mapped to the second channel for the $q^{th}$ OFDM symbol is defined as below:

$$d(i_{SS}=2, q, k) = \frac{1}{\sqrt{2}}\left(\left(2 \times c_{2k}^{(i_{ss}=1,q)} - 1\right) - j\left(2 \times c_{2k+1}^{(i_{ss}=1,q)} - 1\right)\right)$$

$$d(i_{SS}=2, q, P(k)) = \frac{1}{\sqrt{2}}\left(\left(2 \times c_{2k}^{(i_{ss}=2,q)} - 1\right) - j\left(2 \times c_{2k+1}^{(i_{ss}=2,q)} - 1\right)\right),$$

wherein $d(i_{ss}=1, q, k)$ denotes a constellation point mapped to a first half of subcarriers in the first channel, $d(i_{ss}=1, q, P(k))$ denotes a constellation point mapped to a second half of the subcarriers in the first channel, $d(i_{ss}=2, q, k)$ denotes a constellation point mapped to a first half of subcarriers in the second channel, $d(i_{ss}=2, q, P(k))$ denotes a constellation point mapped to a second half of the subcarriers in the second channel, $i_{ss}$ denotes an index for space-time streams, STSs, k denotes a subcarrier index, wherein $P(k)$ is defined as below:

$$P(k) = k + \frac{N_{SD}}{1} \text{ for } k = 0, 1, 2, \ldots, \frac{N_{SD}}{2} - 1,$$

wherein $N_{SD}$ denotes a number of subcarriers per channel,
wherein input encoded bits are divided into groups of $N_{CBPS}$ bits, and bits included in each group are defined as below:

$$(c_0^{(iss,q)}, c_1^{(iss,q)}, \ldots, c_{N_{CBPS}-1}^{(iss,q)}),$$

wherein $N_{CBPS}$ denotes a number of coded bits per OFDM symbol,
wherein each pair of bits included in each group is defined as below:

$$(c_{2k}^{(iss,q)}, c_{2k+1}^{(iss,q)}).$$

8. The method of claim 7, wherein a physical protocol data unit, PPDU, comprising the transmitted signal comprises a field indicating that a staggered quadrature phase shift keying, SQPSK, modulation method is applied for the aggregated channels.

9. The method of claim 8, wherein the PPDU is an enhanced directional multi gigabit, EDMG, OFDM mode PPDU.

10. The method of claim 7, wherein the first channel has a bandwidth of 2.16 GHz or 4.32 GHz, and the second channel has a bandwidth of 2.16 GHz or 4.32 GHz.

11. A station device (100) for transmitting a signal in a wireless local area network, WLAN, system, the station device (100) comprising:
- a transceiver (130) having at least one radio frequency, RF, chain and configured to transmit and receive signals to and from another station device; and
- a processor (110) connected to the transceiver (130) to process signals transmitted and received to and from the another station device, wherein the processor (110) is configured to:

map a modulation symbol value and a conjugated value of the modulation symbol value to a first channel and a second channel respectively, wherein the modulation symbol value is related with each pair of bits included in input encoded bits, wherein the first channel and the second channel are included in aggregated channels; and transmit signals mapped to the first channel and the second channel to the second STA through the aggregated channels, wherein the modulation symbol value mapped to the first channel for a $q^{th}$ orthogonal frequency division multiplexing, OFDM, symbol is defined as below:

$$d(i_{SS}=1, q, k) = \frac{1}{\sqrt{2}}\left(\left(2 \times c_{2k}^{(i_{SS}=1,q)} - 1\right) + j\left(2 \times c_{2k+1}^{(i_{SS}=1,q)} - 1\right)\right)$$

$$d(i_{SS}=1, q, P(k)) = \frac{1}{\sqrt{2}}\left(\left(2 \times c_{2k}^{(i_{SS}=2,q)} - 1\right) + j\left(2 \times c_{2k+1}^{(i_{SS}=2,q)} - 1\right)\right),$$

wherein the conjugate value of the modulation symbol value mapped to the second channel for the $q^{th}$ OFDM symbol is defined as below:

$$d(i_{SS}=2, q, k) = \frac{1}{\sqrt{2}}\left(\left(2 \times c_{2k}^{(i_{SS}=1,q)} - 1\right) - j\left(2 \times c_{2k+1}^{(i_{SS}=1,q)} - 1\right)\right)$$

$$d(i_{SS}=2, q, P(k)) = \frac{1}{\sqrt{2}}\left(\left(2 \times c_{2k}^{(i_{SS}=2,q)} - 1\right) - j\left(2 \times c_{2k+1}^{(i_{SS}=2,q)} - 1\right)\right),$$

wherein $d(i_{ss}=1, q, k)$ denotes a constellation point mapped to a first half of subcarriers in the first channel, $d(i_{ss}=1, q, P(k))$ denotes a constellation point mapped to a second half of the subcarriers in the first channel, $d(i_{ss}=2, q, k)$ denotes a constellation point mapped to a first half of subcarriers in the second channel, $d(i_{ss}=2, q, P(k))$ denotes a constellation point mapped to a second half of the subcarriers in the second channel, $i_{ss}$ denotes an index for space-time streams, STSs, k denotes a subcarrier index, wherein P(k) is defined as below:

$$P(k) = k + \frac{N_{SD}}{1} \text{ for } k = 0, 1, 2, \ldots, \frac{N_{SD}}{2} - 1,$$

wherein $N_{SD}$ denotes a number of subcarriers per channel, wherein the input encoded bits are divided into groups of $N_{CBPS}$ bits, and bits included in each group are defined as below:

$$(c_0^{(iSS,q)}, c_1^{(iSS,q)}, \ldots, c_{N_{CBPS}-1}^{(iSS,q)}),$$

wherein $N_{CBPS}$ denotes a number of coded bits per OFDM symbol, wherein each pair of bits included in each group is defined as below:

$$(c_{2k}^{(iSS,q)}, c_{2k+1}^{(iSS,q)}).$$

12. The station device (100) of claim 11, wherein a physical protocol data unit, PPDU, comprising the transmitted signal comprises a field indicating that a staggered quadrature phase shift keying, SQPSK, modulation method is applied for the aggregated channels.

13. The station device (100) of claim 12, wherein the PPDU is an enhanced directional multi gigabit, EDMG, OFDM mode PPDU.

14. A station device (150) for receiving a signal in a wireless local area network, WLAN, system, the station device (150) comprising:
- a transceiver (180) having at least one radio frequency, RF, chain and configured to transmit and receive signals to and from another station device; and
- a processor (160) connected to the transceiver (180) to process signals transmitted and received to and from the another station device, wherein the processor (160) is configured to:

receive signals through aggregated channels comprising a first channel and a second channel; and decode bit information received based on a modulation symbol value mapped to the first channel and a conjugate value of the modulation symbol value mapped to the second channel, wherein the modulation symbol value mapped to the first channel for a $q^{th}$ orthogonal frequency division multiplexing, OFDM, symbol is defined as below:

$$d(i_{SS}=1, q, k) = \frac{1}{\sqrt{2}}\left(\left(2 \times c_{2k}^{(i_{SS}=1,q)} - 1\right) + j\left(2 \times c_{2k+1}^{(i_{SS}=1,q)} - 1\right)\right)$$

$$d(i_{SS}=1, q, P(k)) = \frac{1}{\sqrt{2}}\left(\left(2 \times c_{2k}^{(i_{SS}=2,q)} - 1\right) + j\left(2 \times c_{2k+1}^{(i_{SS}=2,q)} - 1\right)\right),$$

wherein the conjugate value of the modulation symbol value mapped to the second channel for the $q^{th}$ OFDM symbol is defined as below:

$$d(i_{SS}=2, q, k) = \frac{1}{\sqrt{2}}\left(\left(2 \times c_{2k}^{(i_{SS}=1,q)} - 1\right) - j\left(2 \times c_{2k+1}^{(i_{SS}=1,q)} - 1\right)\right)$$

$$d(i_{SS}=2, q, P(k)) = \frac{1}{\sqrt{2}}\left(\left(2 \times c_{2k}^{(i_{SS}=2,q)} - 1\right) - j\left(2 \times c_{2k+1}^{(i_{SS}=2,q)} - 1\right)\right),$$

wherein $d(i_{ss}=1, q, k)$ denotes a constellation point mapped to a first half of subcarriers in the first channel, $d(i_{ss}=1, q, P(k))$ denotes a constellation point mapped to a second half of the subcarriers in the first channel, $d(i_{ss}=2, q, k)$ denotes a constellation point mapped to a first half of subcarriers in the second channel, $d(i_{ss}=2, q, P(k))$ denotes a constellation point mapped to a second half of the subcarriers in the second channel, $i_{ss}$ denotes an index for space-time streams, STSs, k denotes a subcarrier index, wherein P(k) is defined as below:

$$P(k) = k + \frac{N_{SD}}{1} \text{ for } k = 0, 1, 2, \ldots, \frac{N_{SD}}{2} - 1,$$

wherein $N_{SD}$ denotes a number of subcarriers per channel,
wherein input encoded bits are divided into groups of $N_{CBPS}$ bits, and bits included in each group are defined as below:

$$(c_0^{(iSS,q)}, c_1^{(iSS,q)}, \ldots, c_{N_{CBPS}-1}^{(iSS,q)}),$$

wherein $N_{CBPS}$ denotes a number of coded bits per OFDM symbol,
wherein each pair of bits included in each group is defined as below:

$$(c_{2k}^{(iSS,q)}, c_{2k+1}^{(iSS,q)}).$$

15. The station device (150) of claim 14, wherein a physical protocol data unit, PPDU, comprising the transmitted signal comprises a field indicating that a staggered quadrature phase shift keying, SQPSK, modulation method is applied for the aggregated channels.

* * * * *